United States Patent Office 2,774,780
Patented Dec. 18, 1956

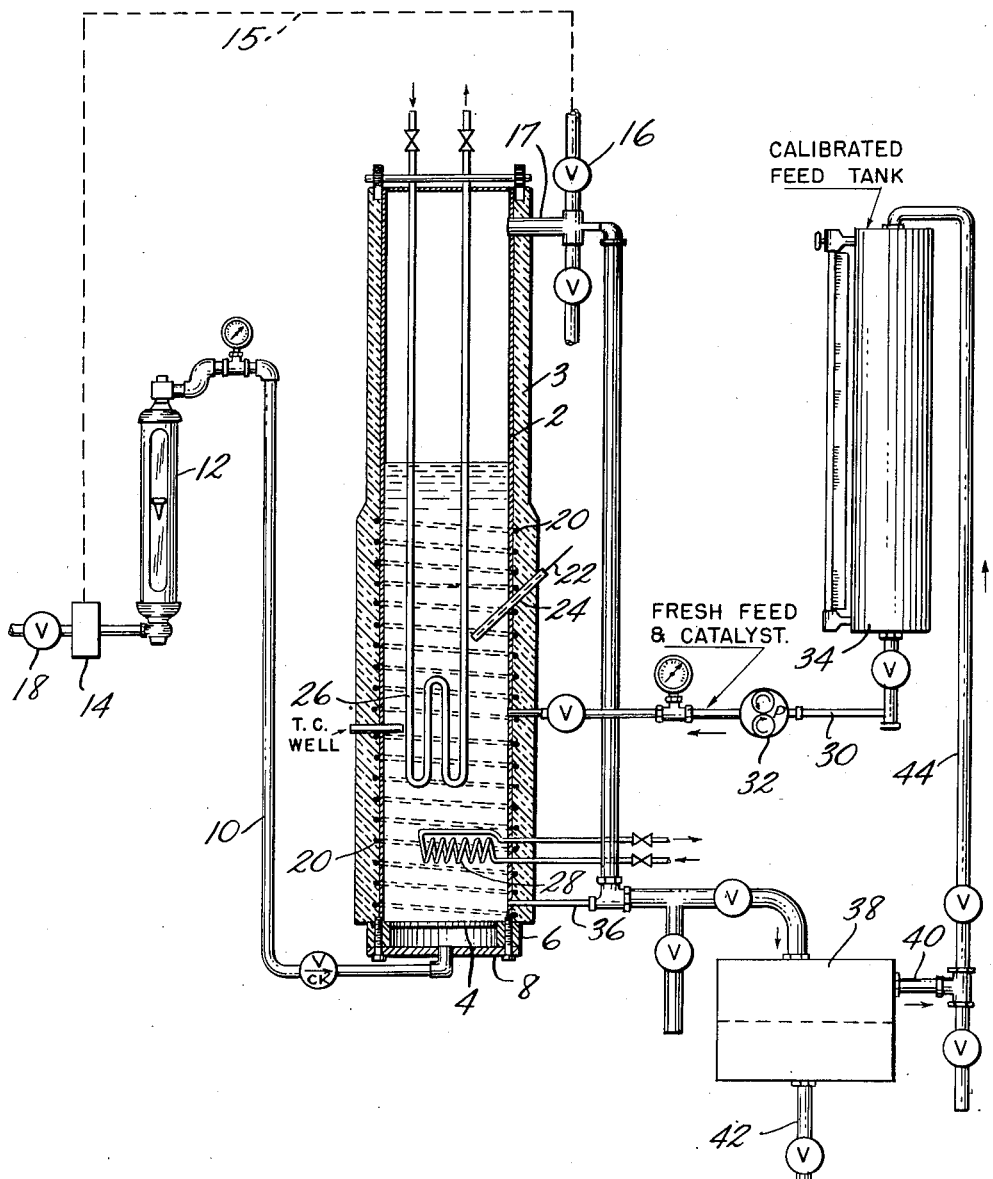

2,774,780

OXIDIZED OIL PRODUCT AND PROCESS FOR THE PRODUCTION THEREOF

Joseph J. Szabo, Warrensville, and David Frazier, Cleveland Heights, Ohio, assignors to The Standard Oil Company, Cleveland, Ohio, a corporation of Ohio Application September 11, 1952, Serial No. 309,088

1 Claim. (Cl. 260—452)

This invention relates to a continuous process for oxidizing refined mineral oils and also to novel oxidized products obtained thereby.

The process of the present invention is unique in that a two phase product is formed. The lower phase product is highly oxidized, and when neutralized, is useful as a drying compound, wetting agent, a soluble oil, and for other purposes for which a highly oxidized oil is suitable. The upper phase product is much less oxidized and cannot be neutralized to form a suitable soluble oil base.

The invention will be further illustrated by reference to the accompanying drawing in which the single figure shows a flow sheet of a typical apparatus that can be used in the present invention for continuously oxidizing oils. A reactor 2 made of stainless steel is closed at the bottom by a plate consisting of a sintered stainless steel disk 4 having a mean pore opening of 35 microns which is soldered to a stainless steel ring 6. The plate is supported by an aluminum plate 8 fitted with an inlet for metered air which is introduced into the reactor through line 10. The sintered disk subdivides the air into fine particles. The air introduced into the reactor is measured by calibrated flowmeter 12 and the pressure in the air line and reactor is regulated by regulator 14, said regulator 14 being operated in conjunction with valve 16 on the discharge air line 17 on the top of the reactor 2 through a connection 15. Air line 10 is provided with any type of suitable valve 18 and the line 10 may be connected to any convenient source of compressed air.

The reactor is heated by means of a coil of Nichrome wire 20, said coil being wound around the lower half of the reactor. The current to the coil 20 is controlled by thermocouple 22 immersed in thermocouple well 24 in the side of reactor 2. The temperature may be regulated by any suitable means for controlling the electrical input to the heater.

The reactor 2 is also provided with a coil 26 which extends into the closed top of the reactor and a coil 28 which extends into the reactor near the bottom thereof. Cooling water may be circulated through the coils 26 and 28 for the purpose of cooling the reaction mixture. By means of the heating and cooling means described the temperature of the oil in the reactor may be adequately controlled.

The entire reactor is covered with a one-inch coating of magnesia insulation 3.

A mixture of fresh feed oil, preferably admixed with any conventional oil oxidation catalyst, is fed into the reactor through the line 30. The mixture of fresh feed oil and catalyst may be pumped into the reactor by means of pump 32 which may be any type of suitable metering pump such as a variable-speed gear pump. The suction side of the pump 32 is connected to feed tank 34 which contains a quantity of mixed fresh feed oil, mixed with the catalyst if one is employed.

The oxidized product is taken off near the bottom of the reactor through line 36 and is passed into product receiver 38 where it separates into two phases upon cooling. The top phase may be removed through line 40 and the bottom phase through line 42. The bottom phase removed through line 42 is the desired product. The product removed through line 40 in some instances may be recycled to the fresh feed line through line 44 depending on the product desired.

The operation of this process is as follows: Fresh feed and catalyst are introduced into the reactor 2 from feed tank 34 through line 30. Air is then introduced through line 10 into the bottom of reactor 2. A homogeneous reaction mixture is produced by virtue of the turbulence and frothing created by the air blowing through the oil. A mechanical mixer may be used in place of or as a supplement to the air agitation. Since the process is continuous, product is withdrawn through line 36 at a rate comparable to the feed rate. When the process is first started up the withdrawal may be omitted for a short time and it may take a while to reach equilibrium.

The above described apparatus is intended merely as schematic and is typical of apparatus that may be employed in the process. It will be appreciated that many variations in the form of the reactor, the method of introducing and controlling the oil feed rate, the air feed, temperature, etc., will be apparent to one skilled in the art. It is essential only that the feed of the oil through the reactor be continuous, and that the rate of oil feed, considering the amount of air, the presence and amount of the catalyst, if any, and other reaction conditions be such that the desired oxidation takes place.

The process may be carried out using a refined oil such as a solvent-extracted oil. Oils falling within this definition are well known in the industry, and are made, for example, by solvent refining with a selective solvent such as furfural, phenol and other well known solvents. In general, these refined oils have a relatively low aromatic content and are high in paraffins and naphthenes. Other refining processes which produce a refined oil are acid treatments, such as those which produce a white oil. In general, the oil should have an aniline number of at least 105° C. as an indication of the extent of the refining preferable. The viscosity of the oil is not critical as long as it is a lubricating viscosity, although lower viscosity oils having a range of 100 to 500 SSU at 100° F. are preferred.

The oxidation preferably is carried out in the presence of any conventional oil oxidation catalyst such as manganese naphthenate or manganese stearate in an amount of $\frac{1}{10}$ to $\frac{1}{2}$%. If the oil is less highly refined, it is preferable to bleed in slowly and in minor amounts, immediately after the start of the reaction, an aqueous solution of a strong base such as sodium or potassium hydroxide or carbonate. If the oil is more highly refined, e. g. when white oil having an ASTM aniline point of about 117° C. or more is utilized, no catalyst is required although it is started more readily in the presence of the above mentioned catalysts or a milder catalyst such as cumene hydroperoxide. The use of a catalyst increases the rate of the reaction and permits the use of shorter reaction times and lower reaction temperatures as is well understood in the art.

The reaction temperature may be adjusted considering the amount of catalyst, if any, the oil feed rate and the amount of air to achieve the desired oxidation. Preferably an elevated temperature such as at least 200° F. is used. Too high a temperature imparts a darker color to the oil. Temperatures as low as possible which give the desired amount of oxidation, considering the other variables, are preferred. Practical operating temperatures may be within the range of 250° F. and 350° F.

The pressure in the reactor may vary from atmosphere pressure to any superatmospheric pressure, depending upon the pressure that the reactor and the other components of the system are built to withstand. Low pressures require higher temperatures or longer times to give the desired reaction rate. An elevated pressure is preferably employed such as 25 to 500 pounds per square inch.

As illustrative of an embodiment of the invention, a feed oil was employed which was a solvent-extracted oil having an aniline point of 107° C. The oil had a viscosity of 115 SSU at 100° F. and was mixed with 0.2% by weight of manganese naphthenate as a catalyst. Fresh oil and catalyst feed mixture was introduced into the reactor, which was operated at a pressure of 57 pounds per square inch gauge at a temperature of 320° F. After the reactor was filled with the oil and catalyst mixture, the oxidation was continued by blowing with air until the oil in the reactor had attained a neutralization number of about 20. Following this, fresh oil and catalyst feed were continuously introduced and withdrawn until the operation had reached equilibrium conditions. The time required to introduce and withdraw an amount of oil equivalent to the amount of initial charge was two hours, i. e., the reaction time of two hours is the average residence time of the oil in the reactor.

The reaction product was allowed to cool and separated into two phases and the upper phase constituted 79.6% by weight of the total product. The upper phase had a neutralization number of 28.2, a saponification number of 81, an optical index of 66, and an oxygen content of 5.3%. The lower phase constituted 20.4% by weight of the product, had a neutralization number of 99.5, a saponification number of 250, an optical index of 322 and an oxygen content of 20.4%. Differences in character of the two phases is indicated by the ratios of relative amounts of various oxygenated compounds, as determined by infrared analysis. From the following data, it is seen that the oxygen percentage is much higher in the lower phase.

| | Ratio, lower phase/upper phase |
|---|---|
| $\overset{O}{\underset{\|}{C}}-OH$ | 2.16 |
| C=O | 2.56 |
| C—OOH | 3.30 |
| Total oxygen | 3.82 |

The reaction time was varied in succeeding runs with consequent change in the amount of lower phase produced. The amount of lower phase increased with increasing contact time as shown in the following table. Experiment 1 is the same as that described above.

| Expt. No. | Reaction Conditions | | | Lower Layer | | | Upper Layer |
|---|---|---|---|---|---|---|---|
| | Pressure, p. s. i. | Temp., °F. | Time, hrs. | Percent Prod. | Neut. No.[1] | Sap. No.[1] | Sap. No.[1] |
| 1 | 57 | 320 | 2 | 20.4 | 99.5 | 250 | 80.7 |
| 2 | 60 | 300 | 1.84 | 12.2 | 29.0 | 158.6 | 60.2 |
| 3 | 60 | 300 | 1.45 | 3.5 | 26.4 | 148.5 | 56.9 |

[1] Averages of two determinations on same sample.

It will be seen from the above table that in the third reaction, the temperature and pressure conditions are such that the lower product phase was not very large. However, if the reaction conditions were such that the upper phase reached a saponification number of 60, the lower phase is much larger.

In view of the many variables in the process it is difficult to segregate and correlate those which are responsible for the substantial amount of lower layer formation. However, it is believed obvious to one skilled in the art that the reaction time may be increased, pressure increased, or other variables adjusted so as to obtain the requisite extent of oxidation which will give the desired two phase separation.

While we do not intend to be bound by any theory and our process can be practiced as described heretofore, we have observed that when the oxidation is not carried far enough, for instance, with milder reaction conditions than those in Experiment 3 above, the entire product forms one phase. As the reaction conditions are intensified, a more highly oxidized phase separates and the upper phase does not correspondingly increase in saponification number. From this it is concluded that the more highly oxidized material which would tend to raise the saponification number of the product is insoluble and separates out in the lower phase. Apparently the portion which would separate as the highly oxidized lower phase is not sufficiently insoluble to separate out as a lower layer until the oxidation is carried to a substantial extent, as indicated above.

These results are to be contrasted with a batch process which, as far as we have observed, does not give this two phase separation. For instance, if Experiment 1 were repeated in a batch operation, there would be no layer separation. This layer separation we obtain is believed to result from the fact that in a continuous process some of the oil molecules have a much shorter residence time in the reactor and others have a much longer residence time than they would have in a batch process. This is believed to result in a different degree of oxidation for different molecules, i. e., some of the oil molecules become much more highly oxidized than others during their longer residence in the reactor. It is observed, for instance, that when oil is oxidized in a batch process to a saponification number of 60 there are no molecules of oil that are unoxidized. In the process of our invention, when the upper phase has a saponification number of 60 as in Experiment 2, it has been ascertained that about ⅓ of the molecules are completely unoxygenated. In the batch process it appears that all components are oxidized sufficiently to preclude a two phase separation. If the batch operation were carried to a point where the entire product has a saponification number of 250, the characteristics of this product would be entirely different than the lower layer of Experiment 1 which has a saponification number of 250. It appears that the oxidation to this extent in the presence of lesser oxidized portions modifies the course of the oxidation reactions and gives a new and unique highly oxidized oil.

The upper layer may be recycled, or at least a portion of it recycled. In such a recycling opeartion, of course, the reaction conditions must be adjusted, considering the fact that the feed has already been partially oxidized.

The lower product phase may be used for any of the known uses of a highly oxidized oil. It may, for example, be neutralized with suitable bases such as sodium or potassium hydroxide to give an oil useful as a drying compound for paints or for use as a wetting agent. It can also be diluted with water to form a soluble oil emulsion. The upper phase cannot be so neutralized.

A soluble oil preparation was made by stirring a 50-gram sample of a lower phase product of Experiment 1 with 1.4 ml. of a 13.9 N KOH (twice the theoretical amount used for neutralization). The alkaline product was then diluted 1:10 in water to form a stable emulsion.

In the following claim the reference to "oxygen" includes pure oxygen or oxygen diluted with other gases such as air.

We claim:

The method of forming a soluble oil which comprises oxidizing a solvent-extracted mineral oil having an aniline number of about 107° C. and a viscosity of about 115 SSU at 100° F. in an oxidation zone maintained at a temperature of about 320° F. and a pressure of about 57 lbs. per square inch gauge, continuously introducing said oil into the oxidation zone and continuously withdrawing the oxidized oil from said oxidation zone at substantially the same rate so that the oil has an average residence time in the oxidation zone of about 2 hours, said withdrawn oil comprising two immiscible fractions, the lighter of which has a saponification value of about 81 and the heavier of which has a sponification value of about 250, permitting the oxidized product to separate into two layers, separating the highly oxidized lower layer from the lesser oxidized upper layer, and neutralizing the highly oxidized lower layer with potassium hydroxide to form a soluble oil miscible with water as a stable emulsion.

References Cited in the file of this patent

UNITED STATES PATENTS

| | | |
|---|---|---|
| 1,770,875 | Burwell | July 15, 1930 |
| 2,220,507 | Blount | Nov. 5, 1940 |
| 2,226,378 | King et al. | Dec. 24, 1940 |
| 2,288,769 | Alleman | July 7, 1942 |
| 2,342,028 | Zellner | Feb. 15, 1944 |
| 2,391,236 | Hirsch | Dec. 18, 1945 |
| 2,447,794 | Brewer | Aug. 24, 1948 |